United States Patent [19]

Sochor

[11] Patent Number: 5,103,349

[45] Date of Patent: Apr. 7, 1992

[54] PROCESS FOR DIRECTLY COPYING FREQUENCY MODULATED VIDEO SIGNALS FROM MAGNETIC TAPE TO MAGNETIC TAPE

[75] Inventor: Josef Sochor, Dieburg, Fed. Rep. of Germany

[73] Assignee: BTS Broadcast Television Systems GmbH, Darmstadt, Fed. Rep. of Germany

[21] Appl. No.: 423,600

[22] PCT Filed: Apr. 10, 1985

[86] PCT No.: PCT/DE85/00111

§ 371 Date: Aug. 28, 1985

§ 102(e) Date: Aug. 28, 1985

[87] PCT Pub. No.: WO85/05210

PCT Pub. Date: Nov. 21, 1985

Related U.S. Application Data

[63] Continuation of Ser. No. 144,619, Jan. 11, 1988, abandoned, which is a continuation of Ser. No. 774,608, Aug. 28, 1985, abandoned.

[30] Foreign Application Priority Data

Apr. 28, 1984 [DE] Fed. Rep. of Germany ....... 3415956

[51] Int. Cl.$^5$ .................................................. H04N 5/94
[52] U.S. Cl. ...................................... 360/15; 358/336; 360/38.1
[58] Field of Search ................. 360/15, 30, 33.1, 38.1; 358/335, 336; 369/84

[56] References Cited

U.S. PATENT DOCUMENTS

| | | | |
|---|---|---|---|
| 3,356,794 | 12/1967 | Felix | 360/38.1 |
| 3,408,457 | 10/1968 | Boylan | 360/30 |
| 3,911,208 | 10/1975 | Johns | 360/38.1 |
| 3,947,873 | 3/1976 | Buchan | 360/38.1 |
| 4,184,178 | 1/1980 | Rotter | 360/38.1 |
| 4,409,627 | 10/1983 | Eto | 360/38.1 |
| 4,549,229 | 10/1985 | Nakano | 360/19.1 |
| 4,577,239 | 3/1986 | Sougen | 360/15 |
| 4,618,895 | 10/1986 | Wright | 360/15 X |
| 4,719,522 | 1/1988 | Kaneko et al. | 360/38.1 |

FOREIGN PATENT DOCUMENTS

| | | | |
|---|---|---|---|
| 2726707 | 1/1979 | Fed. Rep. of Germany | 360/38.1 |
| 2083986 | 3/1982 | United Kingdom | 360/38.1 |

OTHER PUBLICATIONS

Electronic Engineering, Feb. 1972, pp. 45, 46.
Patent Abstract of Japan, Dec. 15, 1981, vol. 5, No. 197, No. 56-119585.
Patent Abstract of Japan, Mar. 27, 1984, vol. 8, No. 65, No. 58-211312.
Patent Abstract of Japan, Apr. 21, 1982, vol. 6, No. 62, No. 57-3209.
Type TDA 2740, Oct. 1982.

*Primary Examiner*—Roy N. Envall, Jr.
*Assistant Examiner*—W. R. Young
*Attorney, Agent, or Firm*—Michael J. Striker

[57] ABSTRACT

A process for copying frequency modulated video signals stored on a magnetic tape includes playing back a frequency modulated carrier signal by a reproduction device having a frequency limiting characteristic which is outside the frequency modulation range of the carrier signal. The envelope of the played back FM carrier signal is monitored and if an amplitude drop-out is detected, a dummy signal of a constant frequency which is above or below the frequency modulation range, is inserted at the location of the amplitude drop-out. The processed FM signal is transmitted to a magnetic recording device, limited to a constant amplitude and re-recorded on a magnetic tape.

4 Claims, 2 Drawing Sheets

1

PROCESS FOR DIRECTLY COPYING FREQUENCY MODULATED VIDEO SIGNALS FROM MAGNETIC TAPE TO MAGNETIC TAPE

This application is a continuation of application Ser. No. 144,619, filed Jan. 11, 1988, now abandoned which is a continuation of application Ser. No. 774,608, filed Aug. 28, 1985, now abandoned.

STATE OF THE ART

The invention is based on a process for copying frequency modulated recorded on magnetic storage means signals, wherein a FM signal is retrieved from the storage means, amplified, filtered, limited to a constant amplitude and again recorded.

During the editorial processing of television shows which are stored on a magnetic tape, it is frequently required to change the content of the original recording in a plurality of steps so as to finally receive a transmittable show. Intermediate copies serve for retaining the given state of the change as a basis for the further processing. Therefore, the final result is a recorded magnetic tape, whose individual scene segments were very often editorially changed and copied. It is also a requirement that the determination of the signal quality should remain within established limits, even after multitude of playbacks or copying.

Signals, in particular television signals which for the purpose of the magnetic recording have been modulated on a carrier frequency are copied in accordance with the state of the art in that the signals which are being picked up from the magnetic tape in the reproduction device are amplified, regenerated, limited, corrected as to timing errors and dropouts and are finally demodulated. After transmitting to the recording device, the demodulated signals must again be filtered, distorted, amplified and modulated upon a carrier frequency and finally be recorded to a magnetic tape by electromagnetic converters (magnetic heads).

The known and customary process is disadvantageous in that the original signal distorts due to the repeated application of the operations.

In order to obtain a copy with a rather high quality it is required to reduce the number of operations (modulation operations, demodulation operations, time error corrections etc) to which the signal is subjected to since these operations result in a deterioration of the signal quality. It is therefore advantageous to remain within the range of the carrier frequency signal during the copying operations and not, as hitherto customary, in the video signal range. Thus, the video quality deteriorates only at a minimum after a copying procedure, or expressed in other words, with the same requirements for the video quality, after a multiple copying operations, the number of copies (generations) is increased. A reason why this process had not yet been used resides in the fact that the preparation of the carrier frequency signals before the new recording presents difficulties. The biggest problem is the treatment of dropouts during the FM-copying. The solving of this problem is also the object of this invention.

Basically it is possible to perform a dropout compensation of frequency modulated signals; because of the requirement of an interference free transition located without phase intermittency between the reproduced and inserted signals this is very difficult to achieve. Another possibility is the use of an auxiliary track on which the dropout information would h=recorded parallel to the FM-signal. However, this possibility is eliminated for economic considerations (poor use of the storage surface on the magnetic tape).

ADVANTAGES OF THE INVENTION

The process for storing frequency modulated signals in accordance with the invention has the advantage that independently from the number of playbacks, the original signal is subjected only once to the operations, which are prerequisite for the efficient recording on a magnetic tape and the playback from the magnetic tape.

A further advantage is considered to be that the time transformation operations to which the signal to be recorded had been subjected and the reciprocal return transformation also are only performed once during recording and final playback.

It is particularly advantageous that the additive and cumulative error propagation is substantially reduced due to the reduction of the required operations during copying.

DRAWING

A circuit for performing the inventive process is illustrated in the drawing and is explained in more detail in the following specification. The drawing shows:

FIG. 1 a block diagram of a circuit for performing the process; and

FIG. 2(a–e) time diagrams of the generated signal shapes.

DESCRIPTION OF THE PREFERRED EMBODIMENT

Figure 1:
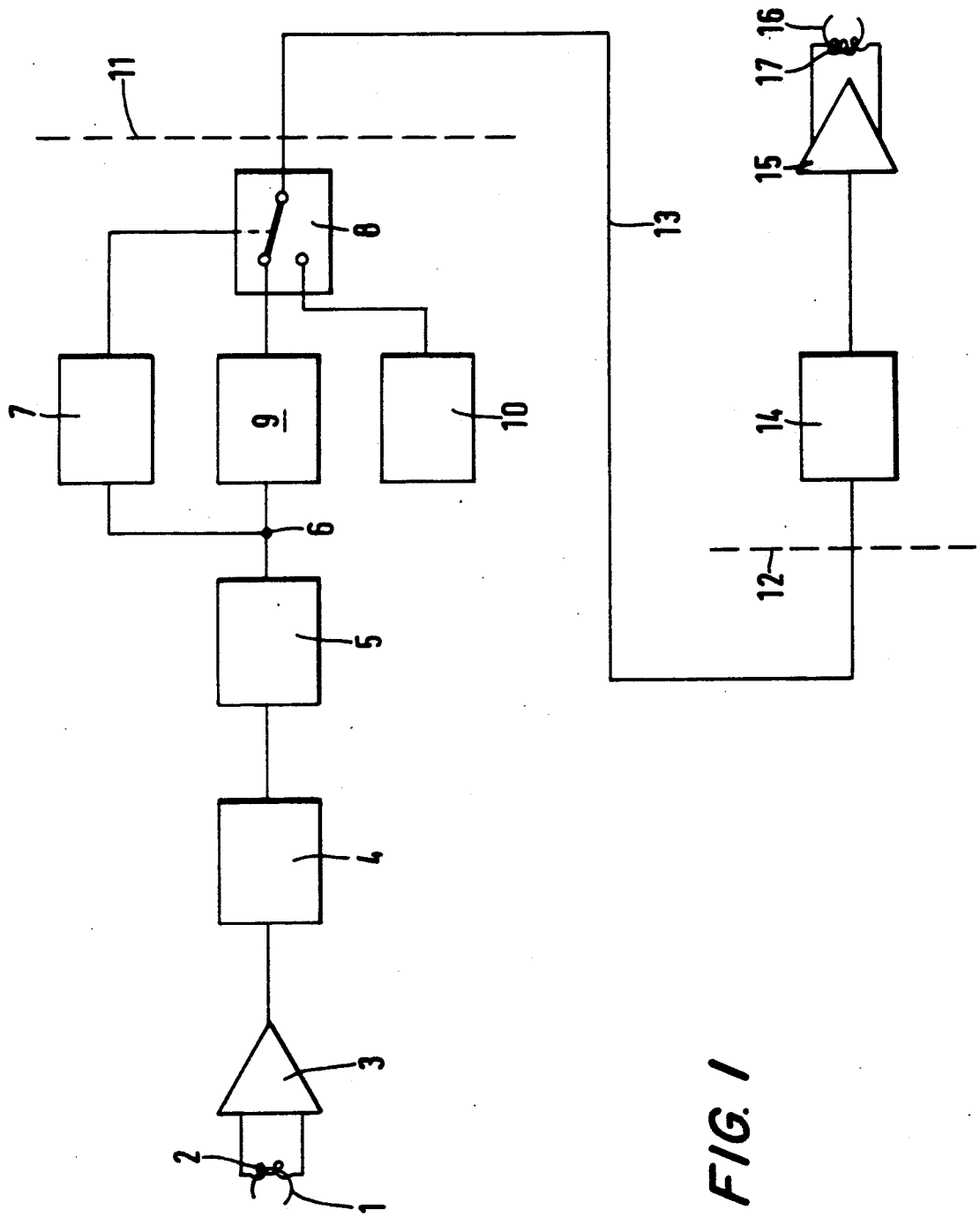
Figure 2A:
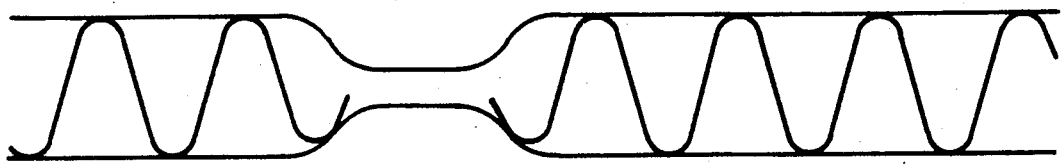
Figure 2B:
Figure 2C:
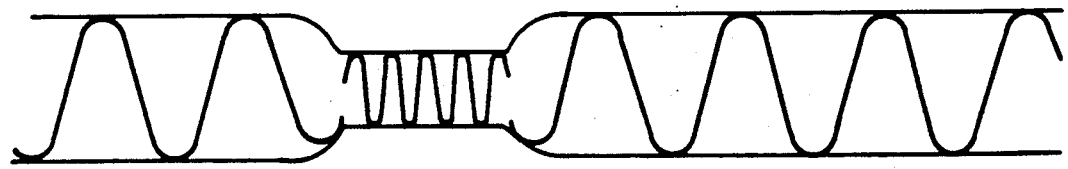
Figure 2D:
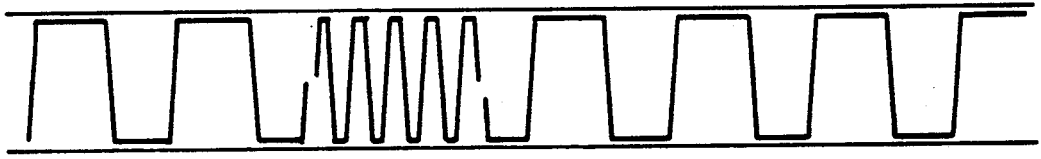
Figure 2E:
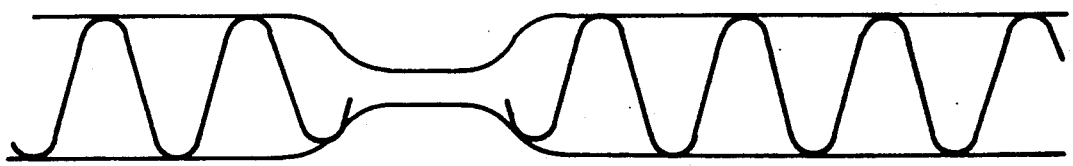

The frequency modulated signal to be recorded is characterized in that its amplitude is constant and that the total information is contained in the time intervals of the zero axis crossings. The reproduced frequency modulated signal is subjected to strong amplitude fluctuations, assuming a correct reproduction equalization had been performed.

These amplitude fluctuations may be so strong that they result in signal dropouts. Before a new recording of a reproduced signal it is required to suppress these amplitude fluctuations. This removal of the amplitude fluctuations which is performed by means of a limiter is necessary because on the nonlinear modulation characteristic of the magnetic tape. During a copying these signal dropouts are evaluated from the frequency modulated signal by means of an envelope curve detector and are compensated in a circuit for suppressing signal dropouts (a dropouts-compensator) before the re-recording takes place. In order to obtain an optimum signal-to-noise ratio, the magnetic tape is modulated from a saturation state into an opposite one. Due to this limiting the information concerning the signal dropouts is lost, which information before the limiting was available in the form of breaks in the signal amplitude.

In the following table these interrelations and the different possibilities of the copying are illustrated:

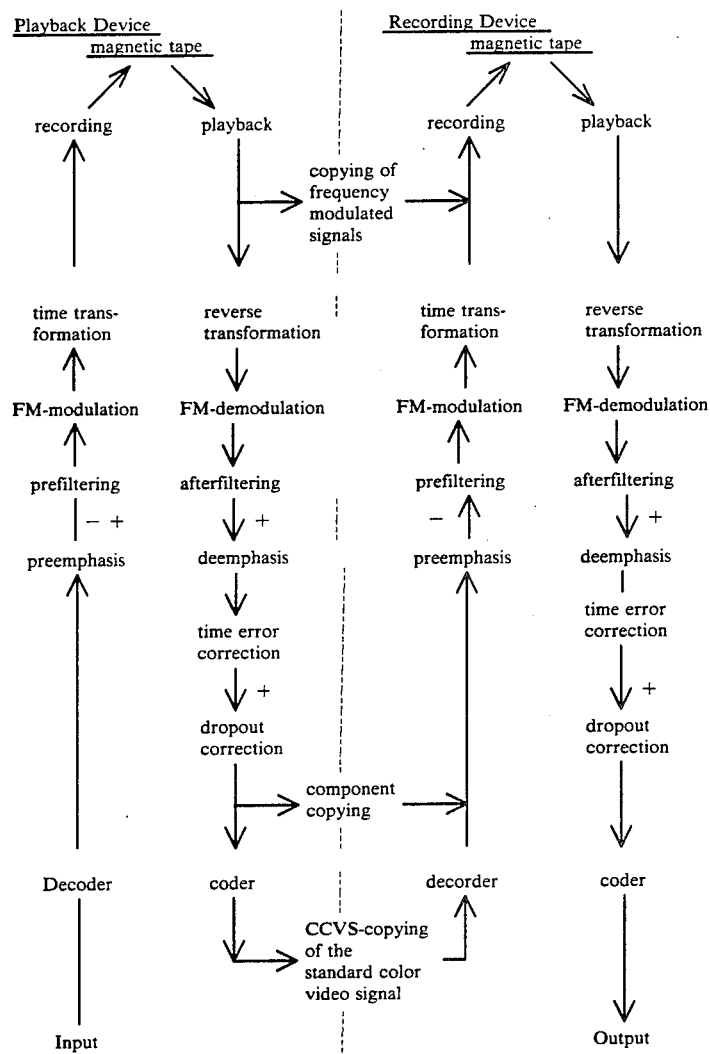

As can be seen the following operations are performed only once during the copying of frequency modulated signals, independently of the number of generations:

Prefiltering of the video signals before the FM-modulation. Linear and nonlinear preemphasis and deemphasis.

FM-modulation of the video signals.

Time transformation during recording.

Reverse transformation during playback.

FM-demodulation of the video signals.

After filtering of the video signals after the FM-demodulation.

Time error balance.

Renewing of the keying off and the synchronization.

Furthermore the additive error propagation is interrupted in the following parameters:

Waviness of the throughout dampening of the video filters, waviness of the group running time of the video filters, frequency drift of the frequency modulators, inexactness of the level adjustment of the demodulators (particularly critical when using the nonlinear preemphasis and deemphasis), mixing product of the frequency modulators, linear and nonlinear distortions of the modulators and demodulators, linear and nonlinear distortions of the nonlinear preemphasis and deemphasis, remaining time error, running time difference between luminance and chrominance, deviation of the time position of the renewed keying off and synchronization relative to the video signal from the nominal value, deviation of the renewed keying off value from the nominal value, mixing products of the time transformation, linear and nonlinear distortions of the time transformation.

As already stated, the total information of the FM-signals is contained in the zero axis crossings or, more correctly stated in the time interval thereof. In view of a prefiltering of the video signal in the FM-modulation the time interval of two successive zero axis crossings occurs within a time interval which has a minimum and a maximum value.

Therefore, it is advantageous to identify a dropout in the frequency modulated signal before the limiting by means of a keyed in dummy signal whose characteristic features are normally absent in the frequency modulated signal and which enables a recognition of the dropouts during the playback of the newly recorded FM video signals.

Therefore, the different characteristic feature may be a time interval of two successive zero axis crossings of the keyed in dummy signal which is above the maximum value or below the minimum value of the time distance of the FM signal. Advantageously, the time interval between two successive zero axis crossings of the keyed in dummy signal is selected constant, i.e., the dummy signal itself is not frequency modulated, and its frequency is constant. In this case a detector is a bandpass filter which is tuned to this recognition frequency, or in the case of an identification below the frequency range of the carrier frequency the detector is a low-pass filter, or in case of an identification above the frequency range of the carrier frequency the detector is a high-pass filter at the output of which, in the case of a signal dropout, a burst signal appears. There is a particular advantageous case of identification above the frequency range of the carrier frequency, wherein the frequency of the keyed in dummy signal is selected so high, that the dummy signal passes the limiter on the recording side without any difficulties but is so high that it cannot be reproduced again because of its too short wave length or is not passed through by the reproduction electronic (reproduction equalizer, low- or band pass for filtering of the modulation frequency). Advantageously, a frequency of the dummy signal is above the limit frequency of the reproduction low-pass filter or in the vicinity of the zero frequency or above the zero frequency of a triangular shaped roll-off-filter (if present). This eliminates a circuit for recognizing the rerecorded identified signal dropouts; in this case the normal as well as the rerecorded signal dropouts are characterized by an amplitude break and both types of signal dropouts can be recognized with the hitherto customary evaluation circuits. Since such an evaluation circuit has a defined running or processing time, the latter must be neutralized in the course of the frequency modulated signals. In order to keep the number of the used components low, the triangular filter may be used for these components.

FIG. 1 illustrates a reproduction magnetic head 1 which scans magnetizing patterns from a magnetic tape (not illustrated), which correspond to frequency modulated signals. The changes of the magnetic state generated in the magnetic head 1 cause induction changes in magnetic coil 2 which are amplified as electrical signals in the reproduction amplifier 3, whose input is connected with the output of the induction coil 2. A reproduction equalizer 4 is provided at the output of the reproduction amplifier 3 for equalizing the distortions caused by the nonlinear characteristic line of the magnetic tape. A low pass filter 5 is connected at the output of the reproduction equalizer 4, wherein the noise constituents above the frequency band of the FM signal generated by the equalization are removed. The frequency modulated or FM signal is available at point 6 of the circuit, that is, at the output of the low pass filter 5. A signal dropout detector 7 is connected to point 6 for detecting signal dropouts contained in the reproduced frequency modulated signal. The dropouts are detected, for example, by monitoring the amplitude envelope curve and actuating an electronic switch 8. The signal dropout detector 7 may be a commercially available building block, for example, of the type TDA 2740, the electronic switch 8 may also be a commercially available building block of the same type. A delay line 9 is connected between point 6 of the circuit and one contact of switch 8 to balance the signal processing time in the signal dropout detector 7 whose output is connected with a control terminal of the electronic switch 8. A sine-wave oscillator 10 is connected to the other contact of the switch 8, and supplies a frequency above the frequency band of the reproduced frequency modulated signal.

During a signal dropout in the frequency modulated signal, the signal dropout detector 7 switches over the switch 8 in such a manner that, instead of the FM signal, the sine wave oscillation supplied by the oscillator 10 is fed as a dummy signal to transmission line 13 at the output of the electronic switch.

The transmission line 13 connects the output of the reproduction or playback device 11 to the input of the copying or recording device 12.

The suppression of the dummy signal is performed in that its amplitude is severely dampened during the playback of a recorded FM signal on the magnetic tape which had been reproduced by means of copying with a dummy signal inserted in signal dropout ranges; due to the frequency of the dummy signal which is outside the range of the carrier frequency of the frequency modulated signal, the signal dropout detector 7 recognizes these locations as signal dropouts, for example, by the envelope curve detection.

The reproduction dampening of the dummy signal whose frequency is above the carrier frequency range of the FM signal to be reproduced can be accomplished by the provision of reproduction magnetic head 1 whose frequency characteristic is insufficient for the reproduction of the shorter wavelength (or higher frequency) magnetization of the dummy signal on the tape, or by the filter curve of the low- or band pass filters which are present in the transmission path.

FIG. 2 illustrates the signal shapes which are generated in the circuit in accordance with FIG. 1. Thereby FIG. 2a illustrates the FM signal which is generated at point 6 of the circuit with an amplitude break of the envelope curve due to a signal dropout. The oscillation in accordance with FIG. 2b represents the sine wave oscillation delivered from the oscillator 10, whose frequency is above the carrier frequency range of the FM signal which has to be processed by the recording circuit of the recording device 12. By recognizing a signal dropout by means of the signal dropout detector 7 the electronic switch 8 is switched from the FM signal to the frequency of the oscillator 10 at the location of the amplitude break. The amplitude of the dummy signal from the oscillator 10 is not critical, it should be only so large that after the subsequent limiting in limiter 14 and amplification in the amplifier 15 of the recording device a signal train illustrated in FIG. 2d, is formed. As described before, the frequency of the dummy signal is so high that it cannot be reproduced by the reproduction equalizer 4 or the low-pass filter 5 in the playback device 11. Consequently, the copied signal after its reproduction at the point 6 in the device 11 (FIG. 2e) has the same shape as the original reproduced signal of FIG. 2a.

It should be mentioned that the invention is not limited to the circuit in accordance with FIG. 1 which illustrates one exemplified embodiment. For example, the delay line 9 may be replaced by the signal delay of a triangular filter which then performs the filtering of the FM signal.

I claim:

1. A process for copying frequency modulated video signals stored on magnetic storage means, comprising the steps of reproducing a frequency modulated carrier signal by a magnetic reproducing device having a frequency limit characteristic for suppressing signal components outside a frequency modulation range of the carrier signal;

processing the reproduced frequency modulated carrier signal by monitoring its amplitude envelope curve to detect signal drop-outs and, if a signal drop-out is detected, inserting at the location of the detected drop-out a dummy signal having a constant amplitude and a constant frequency which is outside said frequency modulation range;

transmitting the processed frequency modulated carrier signal to a magnetic recording device;

adjusting the amplitude of the processed frequency modulated carrier signal inclusive of the inserted dummy signal to a constant common level; and re-recording the adjusted frequency modulated carrier signal on a magnetic storage means.

2. A process as defined in claim 1 wherein the constant amplitude of the processed frequency modulated carrier signal is adjusted in an amplitude limiter.

3. A process for copying frequency modulated video signals stored on magnetic storage means, comprising the steps of reproducing a frequency modulated carrier signal by a magnetic reproducing device having a frequency limit characteristic for suppressing signal components outside a frequency modulation range of the carrier signal;

processing the reproduced frequency modulated carrier signal by monitoring its amplitude envelope curve to detect after a processing time signal drop-outs;

compensating the processing time of the detection of the signal drop-out by a triangular filter disposed at the output of said reproducing device and, if a signal drop-out is detected, inserting at the location of the detected drop-out a dummy signal having a constant amplitude and a constant frequency which is outside said frequency modulation range;

transmitting the processed frequency modulated carrier signal to a magnetic recording device;

adjusting the amplitude of the processed frequency modulated carrier signal to a constant level; and re-recording the adjusted frequency modulated carrier signal on a magnetic storage means.

4. A process for copying frequency modulated video signals stored on magnetic storage means, comprising the steps of reproducing a frequency modulated carrier signal by a magnetic reproducing device having a frequency limit characteristic for suppressing signal components outside a frequency modulation range of the carrier signal;

processing the reproduced frequency modulated carrier signal by monitoring its amplitude envelope curve to detect after a processing time, signal drop-outs;

compensating the processing time of the detection of the signal drop-out by a delay line disposed at the output of said reproducing device and, if a signal drop-out is detected, inserting at the location of the detected drop-out a dummy signal having a constant amplitude and a constant frequency which is outside said frequency modulation range;

transmitting the processed frequency modulated carrier signal to a magnetic recording device;

adjusting the amplitude of the processed frequency modulated carrier signal to a constant level; and re-recording the adjusted frequency modulated carrier signal on a magnetic storage means.

* * * * *